United States Patent
Nakai et al.

(10) Patent No.: US 10,536,595 B2
(45) Date of Patent: Jan. 14, 2020

(54) IMAGE FORMING APPARATUS

(71) Applicant: Sharp Kabushiki Kaisha, Sakai, Osaka (JP)

(72) Inventors: Yasuhiro Nakai, Sakai (JP); Masao Saeda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/010,595

(22) Filed: Jun. 18, 2018

(65) Prior Publication Data

US 2018/0376014 A1 Dec. 27, 2018

(30) Foreign Application Priority Data

Jun. 22, 2017 (JP) .................................. 2017-122224

(51) Int. Cl.
*H04N 1/00* (2006.01)
*G10L 15/00* (2013.01)

(52) U.S. Cl.
CPC ..... *H04N 1/00498* (2013.01); *H04N 1/00411* (2013.01); *H04N 1/00514* (2013.01); *G10L 15/005* (2013.01)

(58) Field of Classification Search
CPC ......... H04M 1/00498; H04M 1/00514; H04M 1/00411; G10L 15/005
See application file for complete search history.

(56) References Cited

U.S. PATENT DOCUMENTS

| | | | | |
|---|---|---|---|---|
| 2011/0244441 A1* | 10/2011 | Okabayashi | ....... | H04N 1/00408 434/365 |
| 2012/0313858 A1* | 12/2012 | Park | ...................... | G06F 3/0238 345/171 |
| 2013/0033716 A1* | 2/2013 | Suese | .................. | G06F 3/04886 358/1.13 |
| 2014/0036291 A1* | 2/2014 | Fujishita | .............. | G06K 15/005 358/1.13 |

FOREIGN PATENT DOCUMENTS

JP    2000-293353 A    10/2000
JP    2006-192747 A    7/2006

* cited by examiner

*Primary Examiner* — Frantz Bataille
(74) *Attorney, Agent, or Firm* — Keating & Bennett, LLP

(57) ABSTRACT

Provided is an image forming apparatus that includes an input unit to which given function selection and information are input, a display unit that displays a plurality of display items each including a function selection item, a language selection unit that selects a user selection language understandable to a user and a manager selection language understandable to a manager, and a display switching unit that switches a language of the display items displayed on the display unit through selection input to the input unit. Two-language simultaneous display, in which each of the display items displayed on the display unit is displayed by using both languages of the user selection language and the manager selection language, and single-language display, in which each of the display items is displayed by using only the user selection language, are switchable.

8 Claims, 12 Drawing Sheets

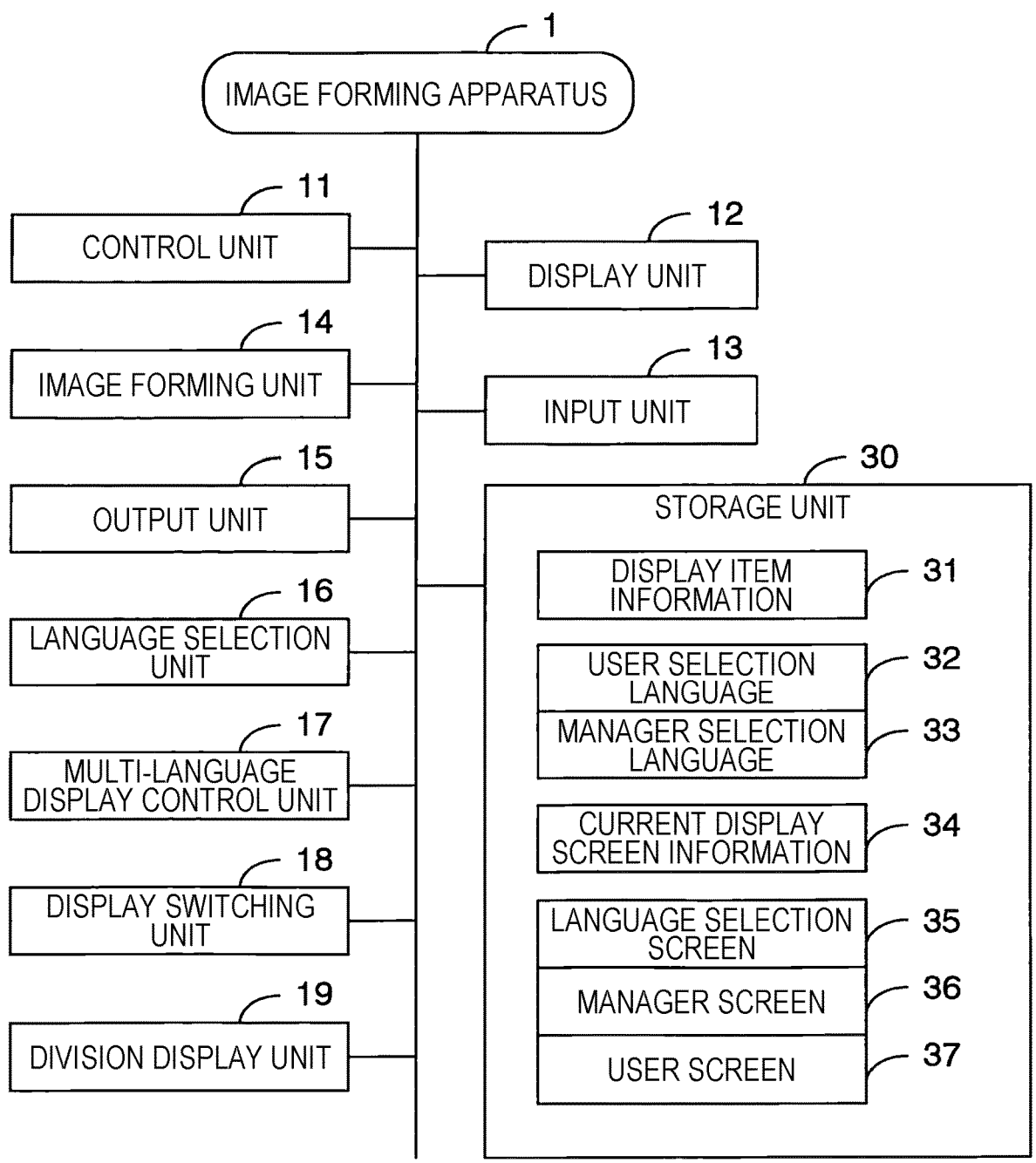

| FUNCTION | LANGUAGE (COUNTRY NAME) | | | | | |
|---|---|---|---|---|---|---|
| | JAPAN | UNITED STATES | CHINA | GERMANY | SPAIN | ITALY |
| 1 | コピ゜ー | COPY | | | | |
| 2 | ファックス | FAX | | | | |
| ⋮ | | | | | | |
| 8 | スキャン | SCAN | | | | |

IMAGE FORMING APPARATUS

BACKGROUND

1. Field

The present disclosure relates to an image forming apparatus, and particularly relates to an image forming apparatus that has a function of switching a language of information displayed on a display screen.

2. Description of the Related Art

An image forming apparatus that has a function of copying a document, and a multifunction peripheral that has a function of scanning a document, a network connection function, and the like in addition to the function of copying a document have been used. In such an image forming apparatus or the like, one in which a display unit and an operation unit which is constituted by a large number of keys are provided separately, or an operation panel that is formed with an operation unit and a display unit overlapped with each other in such a manner that a touch panel is used for the operation unit and a plurality of function selection items or the like are displayed on the display unit is used to input various information or select a function.

Currently, an image forming apparatus is disposed in a store such as a convenience store in some cases, and not only a Japanese but also a foreigner often uses the image forming apparatus at such a store. In a case where a foreigner who cannot read Japanese uses an image forming apparatus by himself or herself in which display content is displayed in Japanese, the foreigner needs to switch a language of a function selection item displayed on a display unit from Japanese to a foreign language understandable to the foreigner in order to understand the display content.

For example, in order to switch the language of information displayed on a display screen, the foreigner who is a user needs to perform a given key input or touch operation to switch the language. As a method of switching the language of information that is displayed, Japanese Unexamined Patent Application Publication No. 2000-293353 proposes an apparatus that compares voice that is uttered by a user for input to language patterns that are stored in advance and switches the language of the display information to a language of a language pattern that matches the input voice to perform display.

Japanese Unexamined Patent Application Publication No. 2006-192747 proposes an image forming apparatus that is configured in such a manner that, in a case where a setting screen for setting a condition setting item is displayed on an operation panel, when a display language of the operation panel is not specified yet, a display language of the setting screen is displayed by time-division in a switching manner among a plurality of languages registered in advance, and, in a case where the operation panel is operated in such a switching display, it is considered that the language that is displayed when the operation is performed is specified, and display is performed only in the displayed language after that.

However, it is often difficult for a foreigner who uses the image forming apparatus for the first time at a store to check by the user himself or herself before use whether a language of information to be displayed is switched by an input operation with a specific key or the like or by voice input. In a case where the display language of the setting screen is displayed by time-division in a switching manner, when there are a large number of display languages, it takes time until the display appears in the language desired by the user, and the user may wait until the operation starts, or the language desired by the user may not be registered. Even when the display language of the setting screen is switchable to a desired foreign language, an input operation method may vary depending on a model of the image forming apparatus. Therefore, there is a case where it is difficult for the user who is the foreigner as the user to execute a desired function of the image forming apparatus by himself or herself without receiving an explanation.

In a case where the user is a foreigner or a Japanese who is unaccustomed to operating the apparatus, he or she often asks a person in charge of the store about the operation at the beginning or in the middle of the operation. In such a case, the person in charge of the store goes to the image forming apparatus and explains to the user how to operate the image forming apparatus or performs a part of the operation.

However, for example, in a case where the foreigner asks the person in charge of the store after switching the language of display information to a desired foreign language other than Japanese, when the person in charge of the store is a Japanese who cannot read the foreign language, it is difficult for the person in charge of the store to recognize the display information displayed in the foreign language and give an appropriate explanation for an operation or carry out an operation aid in some cases. In such a case, when the display language is returned to Japanese understandable to the person in charge of the store, it becomes difficult for the user who is the foreigner and cannot read Japanese to understand the explanation of the person in charge of the store or content of the operation.

Currently, a foreigner is more often employed as a person in charge of a store such as a convenience store. Thus, for example, even when a user is a Japanese, a person in charge is a foreigner who can speak Japanese, or a language of display information is Japanese or English, there is a case where the person in charge who is the foreigner and cannot read Japanese or English is difficult to give an appropriate explanation for an operation or carry out an operation aid.

That is, in a case where native languages of the user and the person in charge of a store are different, it may be difficult for the person in charge of the store to make a rapid and accurate response when giving an explanation of an operation of an image forming apparatus to the user.

The disclosure is made in view of circumstances as described above and provides an image forming apparatus that, in particular, when a user of the image forming apparatus asks a person in charge of a store, allows the person in charge of the store to give an appropriate explanation for an operation or carry out an operation aid to make a rapid and accurate response while the person in charge of the store and the user look at a common display screen.

SUMMARY

The disclosure provides an image forming apparatus including: an input unit to which given function selection and information are input; a display unit that displays a plurality of display items each including a function selection item; a language selection unit that selects a plurality of languages; and a display switching unit that switches a language of the display items displayed on the display unit through selection input to the input unit. Two-language simultaneous display, in which each of the display items displayed on the display unit is displayed by using a first language and a second language, and single-language display, in which each of the display items is displayed by using the first language, are switchable.

BRIEF DESCRIPTION OF THE DRAWINGS

FIG. 1 is a configuration block diagram of an example of an image forming apparatus of the disclosure;

FIGS. 2A to 2E are explanatory views of an example of information used in the image forming apparatus of the disclosure;

DESCRIPTION OF THE EMBODIMENTS

Figure 2B:
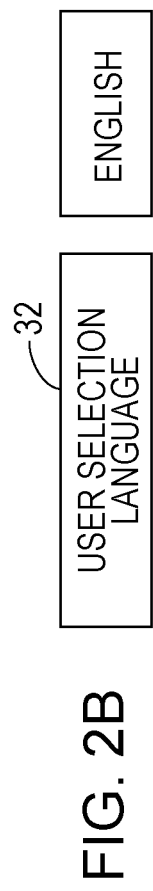

An embodiment of the disclosure will now be described with reference to drawings. Note that, the disclosure is not limited to the following description of examples.
<Explanation for Configuration of Image Forming Apparatus>

FIG. 1 is a configuration block diagram of an example of an image forming apparatus of the disclosure.

An image forming apparatus (hereinafter, also referred to as a Multifunction Peripheral (MFP)) 1 is an apparatus that processes image data and electronic equipment that has a copying function, a printing function, a scanner function, a FAX function, a communication function, and the like, for example.

In FIG. 1, the image forming apparatus (MFP) 1 of the disclosure mainly includes a control unit 11, a display unit 12, an input unit 13, an image forming unit 14, an output unit 15, a language selection unit 16, a multi-language display control unit 17, a display switching unit 18, a division display unit 19, and a storage unit 30.

The control unit 11 is a part that controls operations of components such as the input unit 13 and is mainly realized by a microcomputer constituted by a CPU, a ROM, a RAM, an I/O controller, a timer, and the like.

The CPU organically operates various hardware on the basis of a control program stored in the ROM or the like in advance and executes an input function, a display switch function, or the like of the disclosure.

The display unit 12 is a part that displays a plurality of display items including a function selection item and the like, and displays information used for execution of each of functions, setting content, a result of execution of the function, or the like in order to notify a user about that. For example, an LCD, an organic EL display, or the like is used as the display unit 12.

In a case where a touch panel is used as the input unit 13, the touch panel and the display unit are formed being overlapped with each other.

The input unit 13 is a part by which information such as a character is input or given function selection is input, and a keyboard, a mouse, a touch panel, or the like is used therefor.

The image forming apparatus 1 is provided with an operation panel and the operation panel includes the display unit 12 and the input unit 13. In a case where a touch panel is used as the input unit 13, a region portion of the touch panel serves as the operation panel.

In the following examples, description will be given by assuming that an operation panel in which the display unit and the touch panel are arranged being overlapped with each other is used.

The image forming unit 14 is a part that digitizes input information to convert the information into image data of a format that allows printing, transmission, or the like.

The output unit 15 is a part that outputs information and corresponds to, for example, a printer that prints the information on a paper medium and outputs the resultant. Alternatively, the output unit 15 is a part that causes the digitized image data to be stored in another recording medium or transfers the digitized image data to another information processing apparatus.

The language selection unit 16 is a part that selects a language of information (hereinafter, also referred to as display item information) displayed on the display unit 12. The language selection unit 16 particularly selects a plurality of languages and selects a user selection language understandable to the user and a manager selection language understandable to a manager. The user selection language understandable to the user is a first language and the manager selection language understandable to the manager is a second language. However, the first language and the second language are not limited to the user selection language and the manager selection language. For example, in a case where two users whose native languages are different perform input operations, the native language of one of the users may be selected as the first language and the native language of the other user may be selected as the second language.

For example, a language selection screen for a user, which is used for the user to select the user selection language, is displayed on the display unit 12 and items of a plurality of languages that are prepared in advance are displayed on the language selection screen. The user uses the input unit 13 and performs an input operation to select a desired language from among the plurality of languages displayed on the language selection screen to thereby select the user selection language.

That is, in a case where one desired language item is selected and input from among the languages displayed on the language selection screen, the language item that is selected and input is set as the user selection language. The user selection language that is set is to be stored in the storage unit 30 as a user selection language 32.

Hereinafter, information (display item information) displayed on the display unit 12 is displayed in the user selection language in principle.

A language for displaying the display item information is not only the user selection language but also a language selected for a person in charge of a store.

Upon reception of an inquiry about an operation of the image forming apparatus 1 from the user, the person in charge (or also called a manager) of the store is to go to the image forming apparatus 1 and give an explanation of an operation or carry out an operation aid, and there is a case where the person in charge of the store desires to display information (display item information), which is to be displayed on the display unit 12, in a language understandable to him or her. In particular, when the user selection language selected by the user is not a language understandable to the person in charge of the store, the person in charge of the store is not able to give an appropriate explanation of an operation or the like rapidly unless the display item information is displayed in the language understandable to him or her in some cases.

Thus, a language selection screen for a manger, which is used for the person in charge (manager) of the store to select the manager selection language, is displayed on the display unit 12 and items of a plurality of languages that are prepared in advance are displayed on the language selection screen. The manager uses the input unit 13 and performs an input operation to select a desired language from among the plurality of languages displayed on the language selection screen to thereby select the manager selection language.

That is, in a case where the manager uses the input unit 13 to select and input one desired language item from among the languages displayed on the language selection screen for the manager, the language item that is selected and input is set as the manager selection language. The manager selection language that is set is to be stored in the storage unit 30 as a manager selection language 33.

As described below, in a situation where the person in charge (manager) of the store gives an explanation of an operation or carries out an operation aid, information (display item information) displayed on the display unit 12 is displayed by using both the user selection language and the manager selection language. For example, in a case where the user selection language is "English" and the manager selection language is "Japanese" in "Copy" that is a display item for selecting a copying function, information displayed in two languages together as in "Kopi(Japanese)/Copy" is displayed on the display unit 12.

The multi-language display control unit 17 is a part that converts information (display item information) displayed on the display unit 12 and the information is able to be displayed in multiple languages, and causes the display unit 12 to display the converted display item information. For example, the multi-language display control unit 17 is a part that displays the display item information by using notations of two languages together.

Particularly in the disclosure, in a case where different languages are set to the user selection language and the manager selection language and stored in the storage unit 30 in advance, each of the display items displayed on the display unit 12 is displayed in both the user selection language and the manager selection language. As a display form of two languages, in addition to a type, such as "Kopi/Copy", in which the display item is displayed in two languages together, a notation type as described below may be used.

Though description will be given in the following example for that the display item is displayed in two languages simultaneously, the display item may be displayed in three or more languages simultaneously.

The display switching unit 18 is a part that switches a language of the display item, which is displayed on the display unit 12, through selection input by the input unit 13, and is a part that mainly switches the display screen displayed on the display unit 12 to a display screen (single-language display screen) using one language or a display screen (multi-language simultaneous display screen) using two or more languages. Alternatively, even in a case of single-language display, when the user selection language 32 different from a current display language is set, the display switching unit 18 performs switching to a display screen using the language that is set.

For example, in a case where the user sets a desired user selection language 32 by the language selection unit 16, the display item of the display screen displayed on the display unit 12 is displayed by using only the user selection language 32 in principle. That is, the display switching unit 18 performs switching to a display screen (single-language display screen) using one language.

On the other hand, as described below, in a case where the person in charge of the store selects and inputs a manager operation button displayed on the display unit 12 and sets the manager selection language 33, the display switching unit 18 performs switching to a two-language simultaneous display screen using the user selection language 32 and the manager selection language 33 in principle.

In the disclosure, it is characterized that two-language simultaneous display, in which each of display items displayed on the display unit 12 is displayed by using both languages of the user selection language and the manager selection language, and single-language display, in which each of the display items is displayed by using only the user selection language, are switchable. In a case where the user selection language and the manager selection language are different, the two-language simultaneous display is performed in principle.

As a display method of the two-language simultaneous display, there are various display methods as described below. For example, each of the display items is displayed in one given display frame by using both languages of the user selection language and the manager selection language, and the display item is displayed being divided into a left part and a right part in the display frame by using two language notations or displayed being divided into an upper part and a lower part in the display frame by using two language notations. Alternatively, each of the display items may be displayed in one given display frame by using the user selection language and may be displayed around an outside of the display frame by using the manager selection language.

The division display unit 19 is a part that, when the display screen displayed on the display unit 12 is switched to the two-language simultaneous display screen, displays the display screen of the display unit 12 by dividing the display screen into two display regions of a manager screen and a user screen. The two-language simultaneous display is composed of two-division display screens which are obtained by dividing the display screen of the display unit 12 into the manager screen and the user screen. On the manager screen, display item information is displayed by using the manager selection language, and on the user screen, the display item information is displayed by using the user selection language.

For example, in a case where the manager and the user perform input operations by using the input unit 13 while looking at display items displayed on the display unit 12 together, as in FIGS. 2E and 7A to 7D described below, the display screen of the display unit 12 is divided into two of a left section and a right section, and between the two-division display screens of the display unit 12, the manager screen is displayed on a side closer to a position where the manager stands and the user screen is displayed on a side closer to a position where the user stands. Note that, whether or not to perform such two-division display may be set in advance.

In a situation where the person in charge of the store gives an explanation of an operation of the image forming apparatus 1 or carries out an operation aid with respect to the user, it is considered that the person in charge of the store and the user stand in front of the image forming apparatus 1 from side to side. Accordingly, in order to smoothly give the explanation of the operation or carry out the operation aid by the person in charge of the store, it is desirable that a display item to be operated by the person in charge of the store is principally displayed on the side closer to the position where the person in charge of the store stands, and a display item to be operated by the user is principally displayed on the side closer to the position where the user stands.

The display items displayed on the display unit 12 generally include a setting input item that is set for each of execution functions and a decision input item for deciding content of the setting input item and start of executing a function. It is also desirable that only the setting input item is displayed on the manager screen and the decision input item is displayed on the user screen in consideration of situations of the user and the manager.

For example, when a copying function is used, it is desirable that, in order to rapidly perform setting, the person in charge of the store performs an input operation of a detailed setting input item such as "Color setting of full color or monochrome", "Setting of a paper size", "Paper setting of single-sided or two-sided", or "Magnification setting of enlarge or reduce", and the user himself or herself performs, on his or her own responsibility, an input operation of a decision input item, such as approving of setting content or execution of a copy that involves cost.

Then, the display item (setting input item) for setting input is displayed on the manager screen and the display item (decision input item) for deciding the input is displayed on the user screen, and the person in charge of the store stands on a side where the manager screen is displayed and the user stands on a side where the user screen is displayed.

In a case where the display items displayed on the display unit 12 are displayed being divided into the manager screen and the user screen in this manner, the person in charge of the store who stands at the position closer to the manager screen on which the display item for setting input is displayed is able to give a rapid and appropriate explanation of an operation or carry out an operation aid with respect to the user while the person in charge of the store and the user look at a common display screen.

The storage unit 30 is a part that stores information and a program that are used to execute each function of the image forming apparatus 1 of the disclosure, and a semiconductor storage element, such as a ROM, a RAM, or a flash memory, a storage device, such as an HDD or an SSD, or another storage medium is used therefor.

The storage unit 30 stores, for example, the display item information 31, the user selection language 32, the manager selection language 33, current display screen information 34, a language selection screen 35, a manager screen 36, a user screen 37, and the like.

FIGS. 2A to 2E illustrate explanatory views of an example of information used in the image forming apparatus 1 of the disclosure.

In the display item information 31, content of a selection item displayed on the display unit 12 is stored in advance.

In a case where the image forming apparatus 1 has a plurality of functions, information for identifying each of the functions is displayed on the display unit 12 so that a function to be executed is selectable. For example, when the image forming apparatus 1 has functions of "Copy", "Fax", and "Scan", character strings of "Copy", "Fax", and "Scan" are displayed in Japanese at predetermined positions of the display unit 12 to allow selection of the functions.

The three character strings of "Copy", "Fax", and "Scan" serve as display item information in Japanese, and display item information in Japanese for all items displayed on the display unit 12 is stored in advance.

Additionally, pieces of display item information in a plurality of foreign languages are also stored in advance so that a foreigner is also able to use the image forming apparatus 1. That is, the pieces of display item information are stored in each language or for each country.

FIG. 2A illustrates an example of the display item information 31 stored for each country.

Here, in a case where the image forming apparatus 1 has eight functions, items displayed on the display unit 12 are stored for each of the functions in advance by characters of languages of countries such as Japan, United States, and China. For example, regarding to a function of "Copy", a Japanese notation (Kopi), an English notation (Copy), and other foreign language notations of Chinese, German and the like are stored in advance.

When Chinese is selected as the user selection language, for example, a selection item to be displayed on the display unit 12 is displayed in Chinese by using the Chinese portion of the display item information 31.

Though only a function name is illustrated here, a detailed setting item to be displayed on the display unit 12 after a function is selected is also stored in advance in each language or for each country, similarly.

Additionally, identification information of each of countries that is displayed on the language selection screen is also stored in advance in a language of the corresponding country.

The user selection language 32 is a language selected by the language selection unit 16 when the user performs an input operation to select a desired language while the language selection screen is displayed.

For example, when "American English" is selected and input on the language selection screen as described later, "English" is set as the user selection language 32 as illustrated FIG. 2B.

The manager selection language 33 is a language selected by the language selection unit 16 when the person in charge (manager) of the store performs an input operation to select a desired language while the language selection screen for the manager is displayed.

Figure 2C:

For example, when "Japanese" is selected and input on the language selection screen for the manager as described later, "Japanese" is set as the manager selection language 33 as illustrated FIG. 2C.

In a case where both the user and the person in charge of the store are often Japanese, such as a case where the image forming apparatus 1 is installed in Japan, both the user selection language 32 and the manager selection language 33 may be initially set to "Japanese". Alternatively, in a case where both the user and the manager are often Italian, such as a case where the image forming apparatus 1 is installed in Italia, both the user selection language 32 and the manager selection language 33 may be initially set to "Italian".

The current display screen information 34 is information related to a screen that is currently displayed on the display unit 12.

Figure 2D:

As the current display screen information 34, for example, a selection function that is selected and input for displaying the currently displayed screen, a user language and a manager language which are used in the currently displayed screen, information indicating whether or not to perform simultaneous display in two languages (two-language simultaneous display), and the like as illustrated FIG. 2D are stored.

The information indicating whether or not to perform simultaneous display in two languages (two-language simultaneous display) is information in which whether each of items displayed on the current display screen is displayed by simultaneously using two languages (two-language simultaneous display) of the user language and the manager language or by using only the user language (single-language display) is set.

The current display screen information 34 illustrated in FIG. 2D indicates that the simultaneous display in two languages is set, and thus the display items are displayed in two languages of the user language "German" and the manager language "English" on a screen displayed after "Copy" is selected and input.

For example, on the screen displayed after "Copy" is selected and input, Voll Farbe in "German" and Full Color in "English" are simultaneously displayed as in "Color" that is a display item as one of subordinate concepts of "Copy".

On the other hand, when the single-language display is set, each of the display items is displayed by using only the user language "German".

The information indicating whether or not to perform simultaneous display in two languages is initially set to the single-language display in principle, and when the user selects the user language and performs an input operation by himself or herself without asking the manager, a display screen is to be displayed by using only the selected user language.

On the other hand, as described later, in a case where the user asks the manager, when the manager selects and inputs a manager operation button and selects the manager language different from the user selection language, the two-language simultaneous display is set. When the two-language simultaneous display is set, the items displayed on the display screen thereafter are displayed in two languages. When the user finishes using the image forming apparatus 1 or performs a setting input operation of canceling the two-language simultaneous display, the setting returns to the single-language display using the user selection language.

The language selection screen 35 is a screen for selecting a language that is used by the user or the manager. For example, as illustrated in FIG. 3B described later, the language selection screen 35 is a screen on which a plurality of names of languages that are prepared in the display item information 31 in advance are displayed with notations of the corresponding languages. The user selects and inputs a part in which a name of a desired language is displayed while looking at the language selection screen 35, and the user selection language 32 is set.

The manager screen 36 and the user screen 37 are screens obtained when division display is performed as described above, and as illustrated in FIG. 2E, for example, the display screen of the display unit 12 is divided into a left section and a right section, and the manager screen 36 is displayed on the left side and the user screen 37 is displayed on the right side.

The manager screen 36 is a region in which a setting input item to be subjected to an input operation by the manager is displayed and the user screen 37 is a region in which a decision input item to be subjected to an input operation by the user is displayed.

Figure 2E:
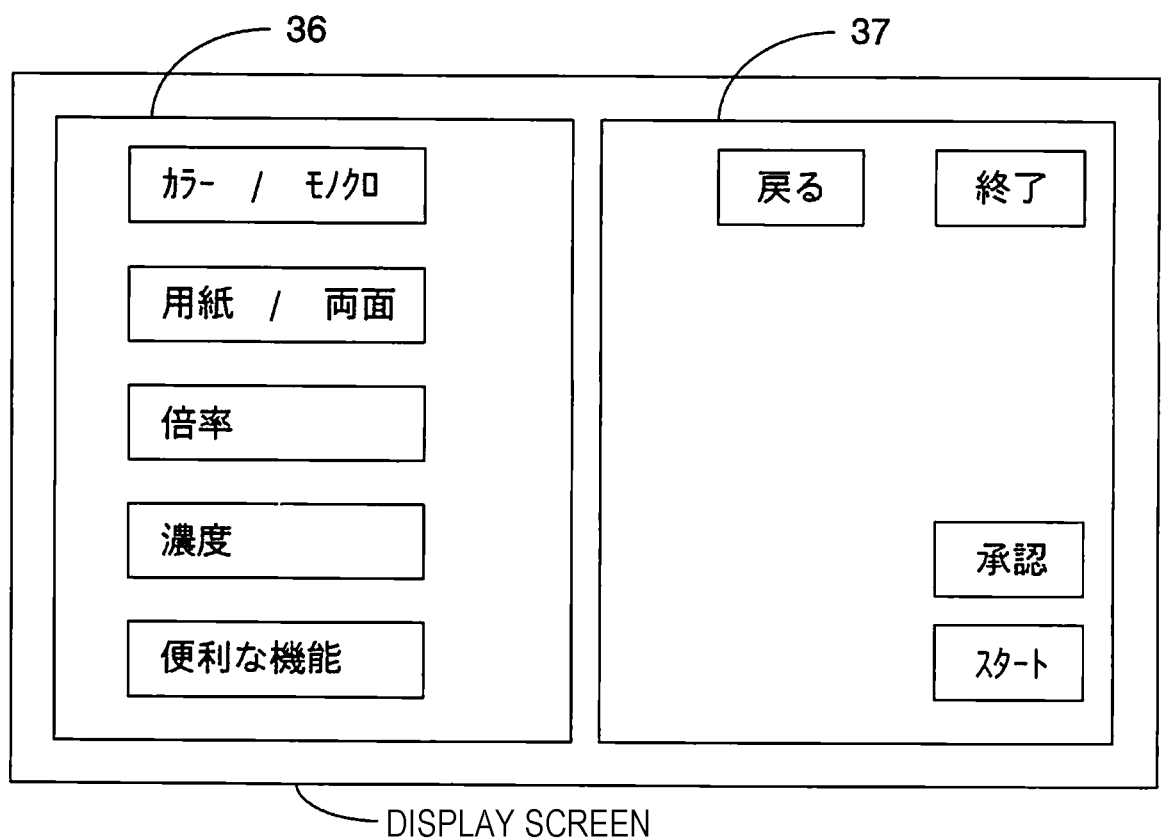

On a display screen of FIG. 2E, display items after "Setting" in the "Copy" function is selected and input are illustrated, and as items to be subjected to an input operation by the manager, setting input items such as "Color/Monochrome", "Paper/Two-Sided", and "Magnification" are displayed on the manager screen 36.

On the other hand, as items to be subjected to an input operation by the user on his or her own responsibility, decision input items such as "Back", "Exit", "OK", and "Start" are displayed on the user screen 37.

However, since the setting input item to be subjected to an input operation by the manager is able to be selected and input by the user himself or herself on his or her responsibility, the same item as the setting input item displayed on the manager screen 36 may be displayed on the user screen 37 by using the user selection language 32.

Though FIG. 2E illustrates a case where both the manager selection language 33 and the user selection language 32 are Japanese, a display item in the manager screen 36 is displayed in the manager selection language 33 and a display item in the user screen 37 is displayed in the user selection language 32.

Figure 7A:
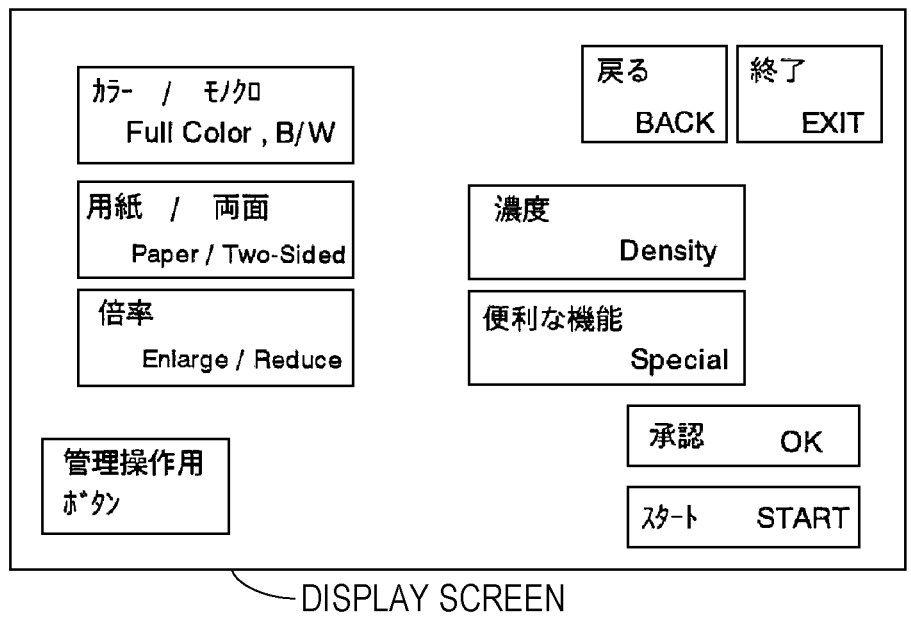
FIGS. 7A to 7D are explanatory views of an example of a screen displayed on the image forming apparatus of the disclosure.
Figure 7B:
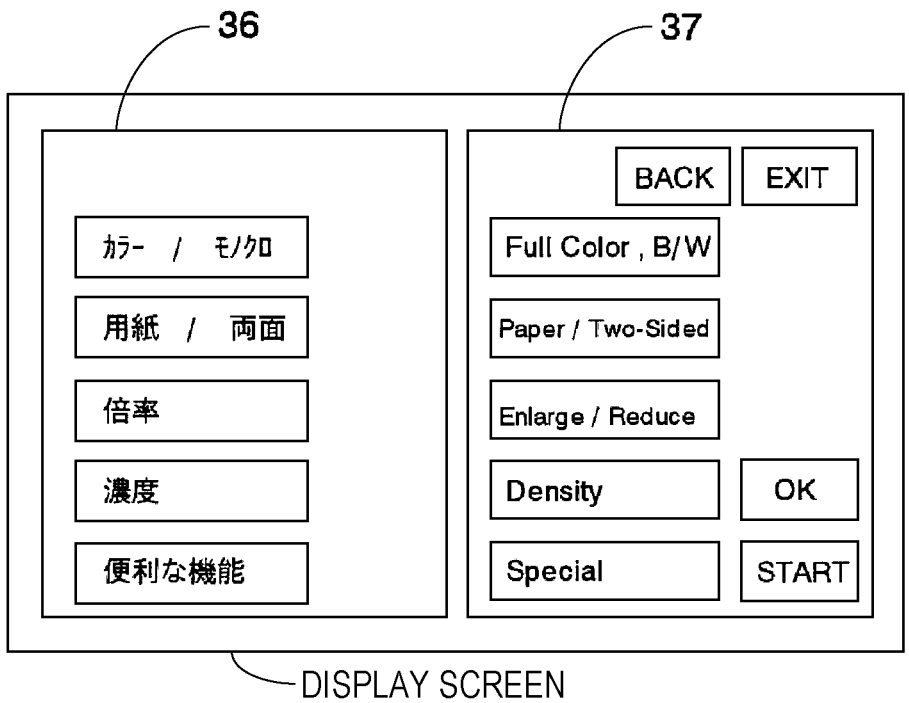

For example, FIG. 7B exemplifies the manager screen 36 and the user screen 37 that are subjected to two-division display when "Japanese" is selected as the manager selection language 33 and "English" is selected as the user selection language 32.

Figure 7D:
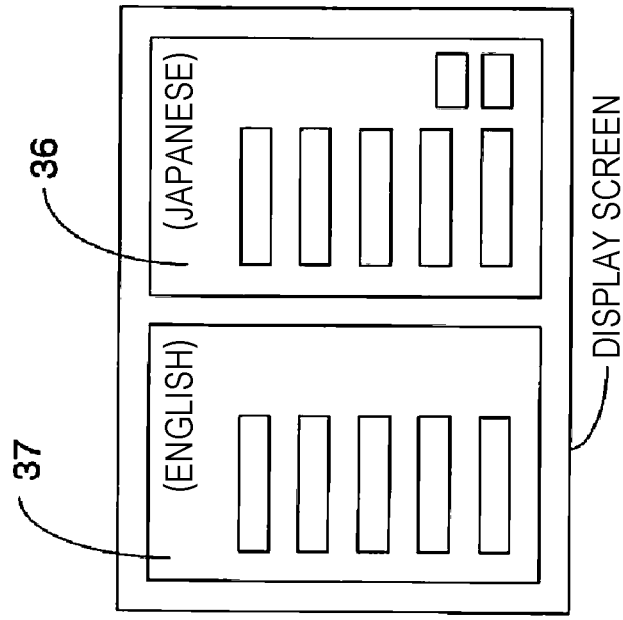
Figure 7C:
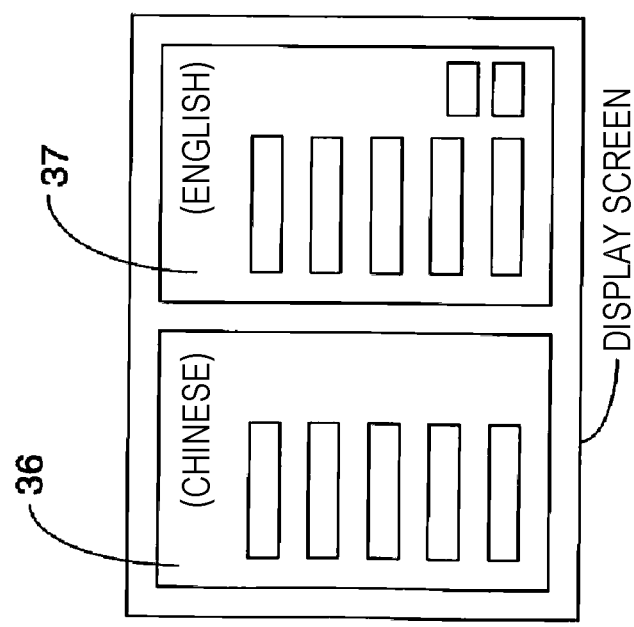

FIG. 7C illustrates a schematic view of the manager screen 36 and the user screen 37 that are subjected to two-division display when "Chinese" is selected as the manager selection language 33 and "English" is selected as the user selection language 32.

There is a case where desired standing positions of the user and the manager when an explanation of an operation or the like is given vary depending on a structure of the image forming apparatus 1, particularly, a positional relationship of an operation panel, a paper placing base, a paper discharging port, and the like.

In a case where it is easy to give an explanation of an operation or carry out an operation aid when the manager stands on the left side and the user stands on the right side with respect to the image forming apparatus 1, it is desirable that the manager screen 36 is displayed on the left side and the user screen 37 is displayed on the right side as illustrated in FIGS. 2E and 7B.

However, in a case where it is convenient to give an explanation of an operation or carry out an operation aid when the user stands on the left side and the manager stands on the right side, it is desirable that the user screen 37 is displayed on the left side and the manager screen 36 is displayed on the right side as illustrated in FIG. 7D.

Accordingly, when the two-division display is performed, it is desirable to perform setting in advance as to on which side of the left and right sides the manager screen 36 or the user screen 37 is to be displayed.

<Explanation of Display Item Displayed on Display Screen of Display Unit>

Hereinafter, an example of a display item that is changed by an input operation of a user or a manager will be described. A touch panel is used as the input unit 13.

Example 1

Here, a case where a user switches a display language of a display item, which is displayed on the display screen of the display unit 12, to a desired language by his or her own input operation will be described.

It is assumed that, in an initial state where the image forming apparatus 1 is activated, both the user selection language 32 and the manager selection language 33 are initially set to "Japanese".

Figure 3A:
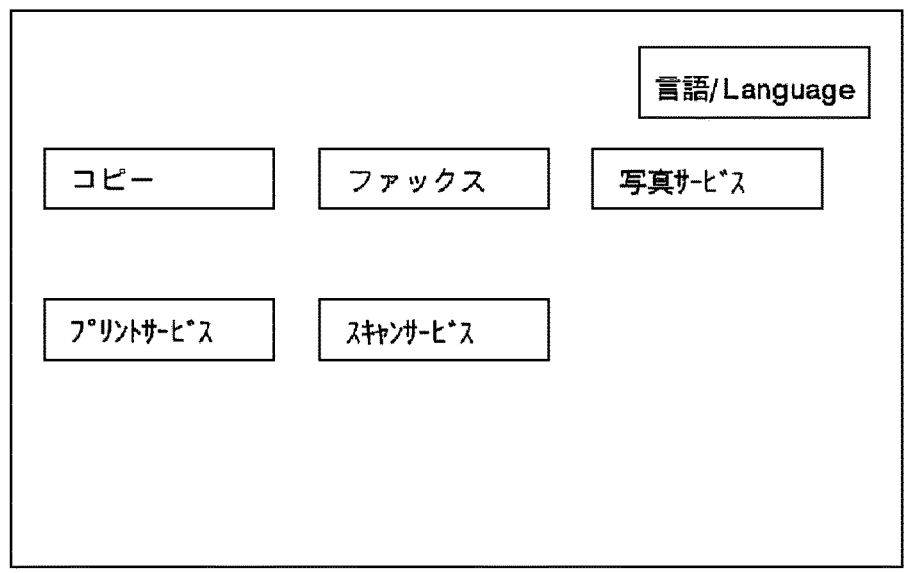
FIGS. 3A to 3C are explanatory views of an example of a screen displayed on the image forming apparatus of the disclosure.
Figure 3B:
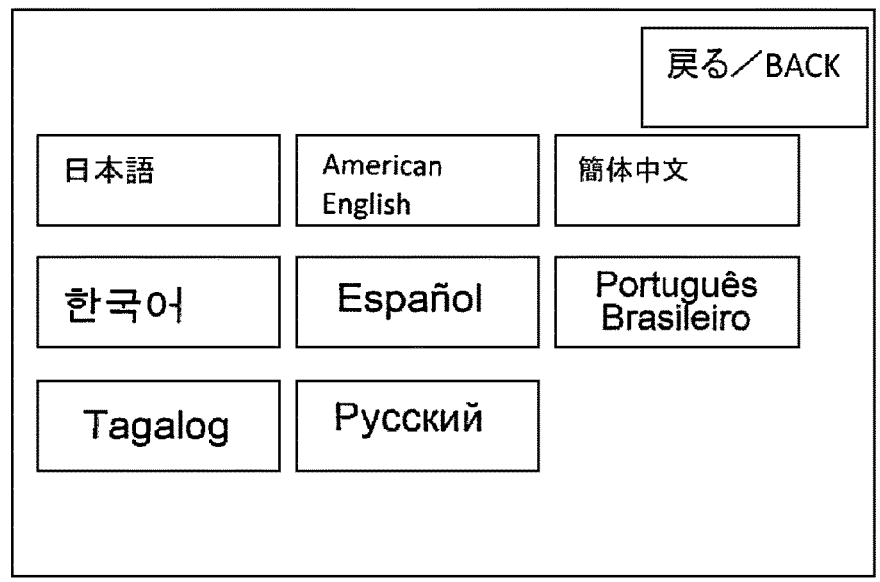
Figure 3C:
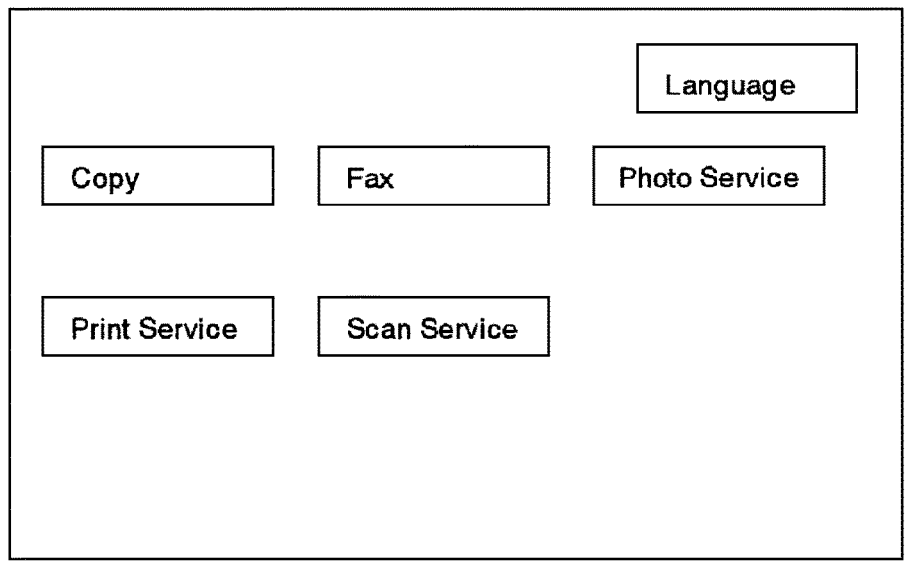

FIGS. 3A to 3C illustrate explanatory views of an example of a screen displayed on the image forming apparatus 1 of the disclosure. FIG. 3A illustrates an example of an initial screen of the display screen displayed on the display unit 12. Here, five display items such as "Copy" are displayed in Japanese, and "Gengo(Japanese)/Language" is displayed on the upper right of the display screen as a setting button region (language selection region) for selecting a display language. In the language selection region, for example, a two-language notation in Japanese and Chinese, or a notation in two or more languages that are frequently used may be made instead of a notation in Japanese and English.

It is assumed that the user comes to the image forming apparatus 1 to execute a desired function in a state where the initial screen as in FIG. 3A is displayed. When the user is a person from an English-speaking country and is not able to understand the Japanese notation, for example, the user performs an operation of switching a display language to "English". That is, the user selects and inputs the language selection region in which "Gengo/Language" is displayed.

When the language selection region is selected and input, a language selection screen as in FIG. 3B is displayed. Here, a plurality of language names, such as "Japanese" and "American English", which are stored in advance are displayed with the notations of the corresponding languages. Alternatively, country names may be displayed. The user selects and inputs a desired language name from among selection items that are displayed. For example, it is assumed that the user selects and inputs "American English" as a selection language. At this time, "English" is set and stored as the user selection language 32.

When the user selects and inputs "American English", each of the display items on the initial screen is switched to be displayed with the notation in "English" as illustrated in FIG. 3C. The display items are displayed in "English" understandable to the user from the English-speaking country, so that the user from the English-speaking country is able to continue a subsequent input operation easily. For example, when the user desires to use the "Copy" function, the user may select and input a region in which "Copy" is displayed.

Figure 4A:
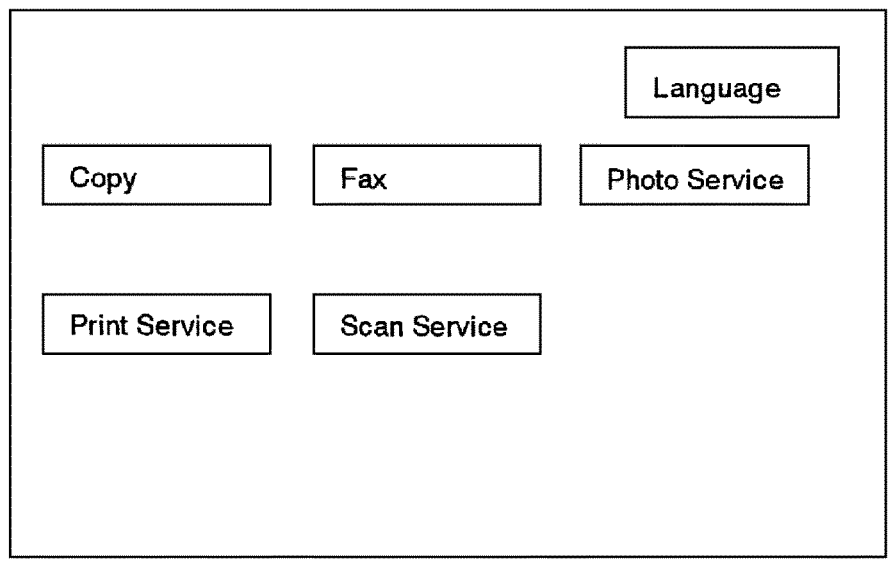
FIGS. 4A to 4C are explanatory views of an example of a screen displayed on the image forming apparatus of the disclosure.
Figure 4B:
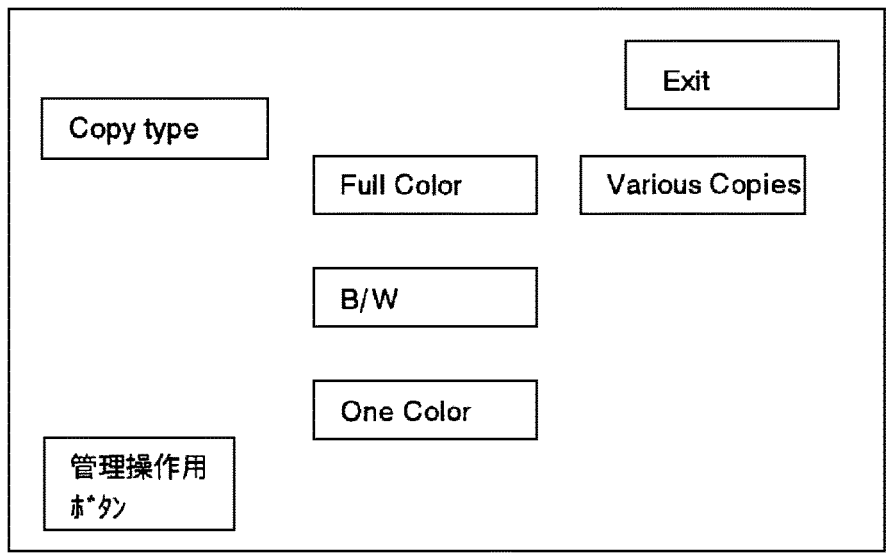
Figure 4C:
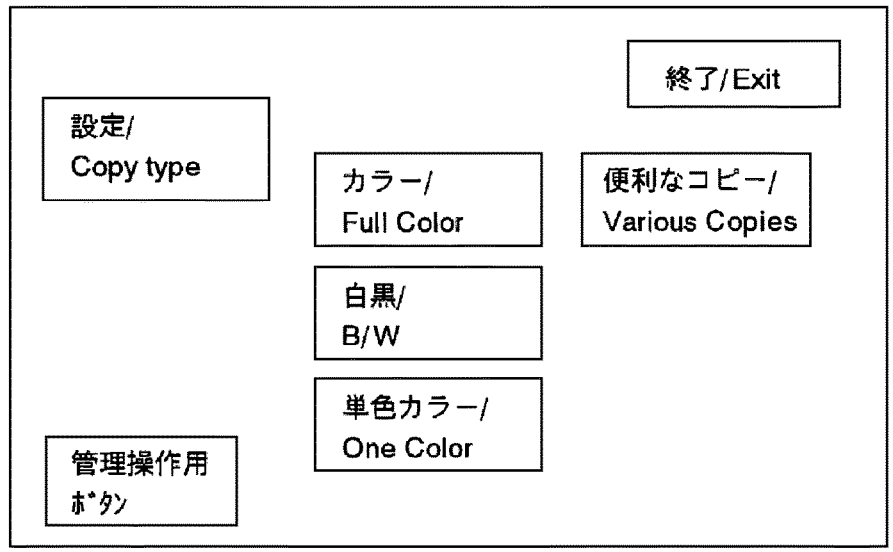

FIGS. 4A to 4C illustrate explanatory views of an example of a screen displayed next to the initial screen of FIG. 3A. FIG. 4A illustrates a display screen with the English notation that is the same as that of FIG. 3C. It is assumed that the user from the English-speaking country selects and inputs the region in which "Copy" is displayed in a display state of FIG. 4A. At this time, as illustrated in FIG. 4B, a detailed setting item of the selected "Copy" function is switched to a copy detailed screen that is displayed in English.

On the lower left of the screen, a display region displayed as "Manager operation button" which is used for the manager to operate is also displayed. "Manager operation button" is a region in which the person in charge of the store (manager) performs an input operation when the manager comes to the image forming apparatus 1 to give an explanation of an operation or carry out an operation aid in response to an inquiry of the user.

When the manager selection language 33 is initially set to "Japanese", "Manager operation button" is displayed with the notation in Japanese, but when the manager selection language 33 is changed to be set to another language, "Manager operation button" is displayed in the manager selection language that is changed to be set.

When different languages are set to the user selection language 32 and the manager selection language 33, display items that are displayed in two languages together may be displayed as the copy detailed screen as illustrated in FIG. 4C instead of FIG. 4B. That is, each of the display items is displayed in two languages of the user selection language 32 and the manager selection language 33.

In this manner, in a case where the notation including the manager selection language 33 is displayed, when the manager comes to give an explanation of an operation later, there is a case where the manager is able to rapidly give an explanation of an operation or carry out an operation aid because the notation understandable to the manager is displayed.

Thereafter, when the user understands what an item displayed on the display unit means, the user is able to execute a desired function by selecting and inputting a region displayed in the user selection language 32 in order without asking the manager.

Example 2

Here, a case where the user needs to ask the manager, in the middle of an input operation, about the operation, and asks the manager, and the manager comes to the image forming apparatus 1 will be described.

Figure 5A:
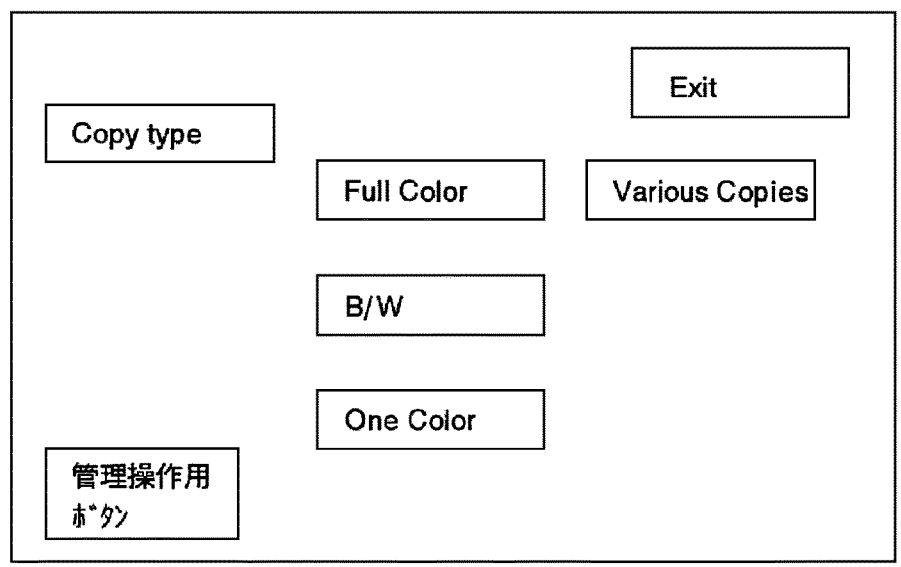
FIGS. 5A to 5C are explanatory views of an example of a screen displayed on the image forming apparatus of the disclosure.
Figure 5B:
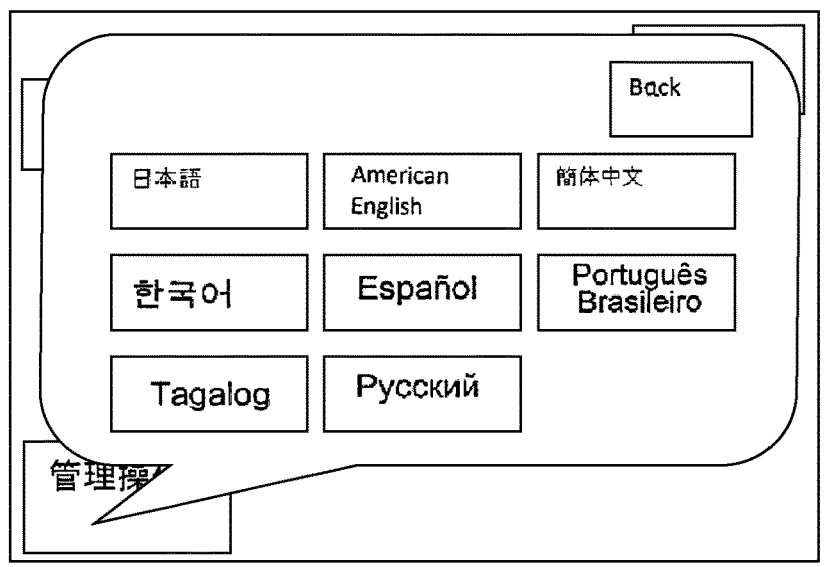
Figure 5C:
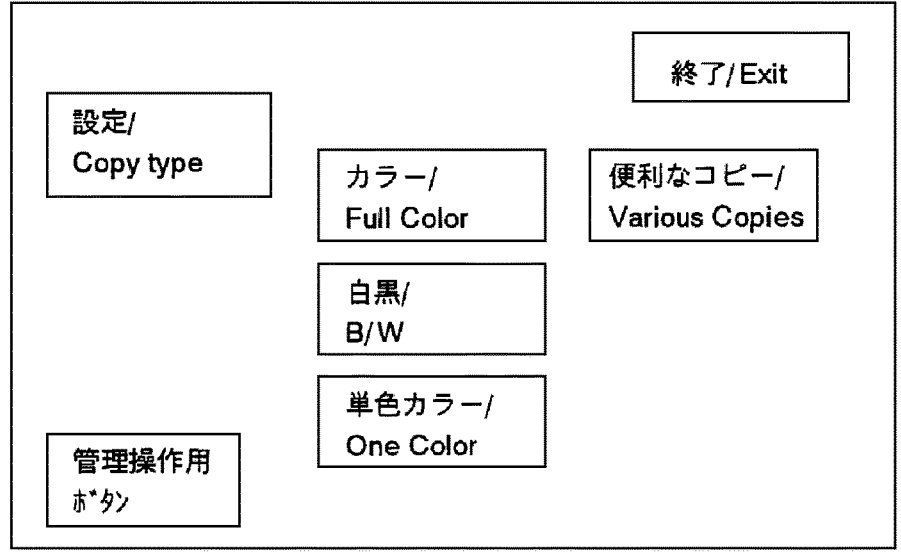

FIGS. 5A to 5C illustrate explanatory views of an example of a screen displayed on the image forming apparatus 1 of the disclosure. FIG. 5A illustrates a state where a copy detailed screen with the English notation that is the same as that of FIG. 4B is displayed. It is assumed that the user asks the manager in such a display state. It is assumed that the manager who is asked needs to go to the image forming apparatus 1 and give an explanation of an operation or carry out an operation aid while asking a situation of the user in trouble, for example.

In this case, the manager selects and inputs "Manager operation button" displayed in FIG. 5A. When the manager selects and inputs "Manager operation button", a language selection screen for selecting the manager selection language 33 is displayed as illustrated in FIG. 5B. The language selection screen is a language selection screen for a manager, and a plurality of language names (or country names) that are selectable are displayed similarly to the language selection screen for the user as illustrated in FIG. 3B.

The manager selects and inputs a desired language name from among selection items that are displayed. When the manager selects and inputs "Japanese" as the selection language, for example, "Japanese" is set and stored as the manager selection language 33.

FIG. 5C illustrates a display screen after the manager selects the manager selection language 33. When the manager selects and inputs "Japanese", the copy detailed screen of FIG. 5A is switched to two-language simultaneous display in which each of the display items is displayed in two languages of "English" and "Japanese" together as illustrated in FIG. 5C. That is, the display item is displayed in two languages of the user selection language 32 and the manager selection language 33.

Thus, the display item is displayed on the common display screen that the user and manager look at in a form understandable to both of the user and the manager. In such a display state, the manager is able to progress an explanation of an operation or the like while looking at the display item in a language understandable to the manager by himself or herself and the user is able to receive the explanation of the operation or the like by confirming the meaning of an input operation performed by the manager while looking at the display item in a language understandable to the user by himself or herself.

Then, when the manager continues to give the explanation of the operation or the like, the display screen is switched to another setting screen, but a display screen after the switching is also displayed with the two-language simultaneous notation in which each of the display items is displayed in two languages of "English" and "Japanese" together, similarly to FIG. 5C.

In FIGS. 5A to 5C, the case where "English" is selected as the user selection language 32 and "Japanese" is selected as the manager selection language 33 has been described, but there is no limitation thereto, and after another language understandable to the user is selected as the user selection language 32 and another language understandable to the manager is selected as the manager selection language 33, the display item may be displayed with the two-language simultaneous notation by using the selected user selection language 32 and the selected manager selection language 33.

Example 3

Here, another example of the two-language simultaneous display illustrated in FIG. 5C will be described. In FIG. 5C, each of the display items is displayed in one display frame and the display frame is divided into two of an upper part and a lower part, and "Japanese" as the manager selection language 33 is displayed on the upper part and "English" as the user selection language 32 is displayed on the lower part together in the display frame. However, in FIG. 5C, both "English" and "Japanese" are displayed closely to the left side of the frame, but may be displayed nearly at the center of the frame. Alternatively, "Japanese" as the manager selection language 33 may be displayed closely to the left side on the upper part and "English" as the user selection language 32 may be displayed closely to a right side on the lower part. Alternatively, "Japanese" as the manager selection language 33 may be displayed on the lower part and "English" as the user selection language 32 may be displayed on the upper part.

Figure 6A:
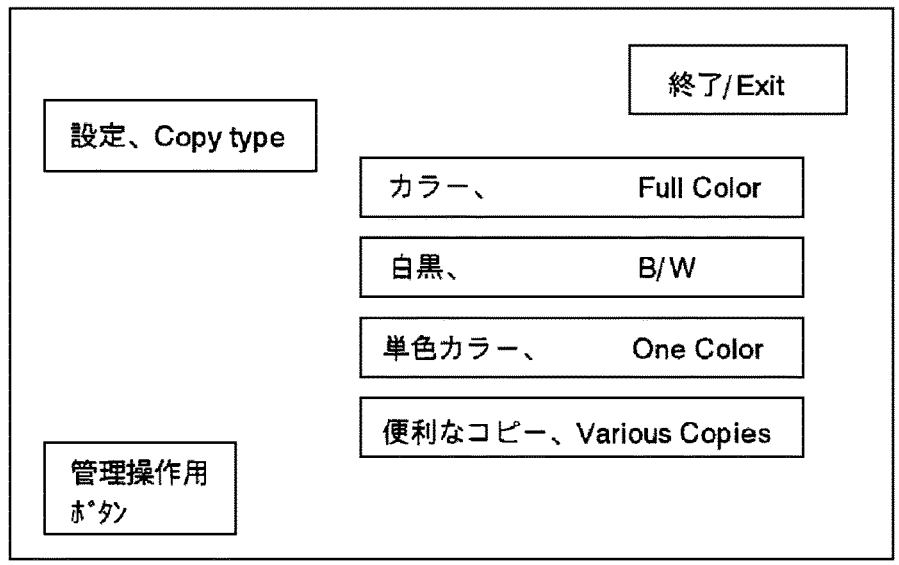
FIGS. 6A to 6C are explanatory views of an example of a screen displayed on the image forming apparatus of the disclosure.
Figure 6B:
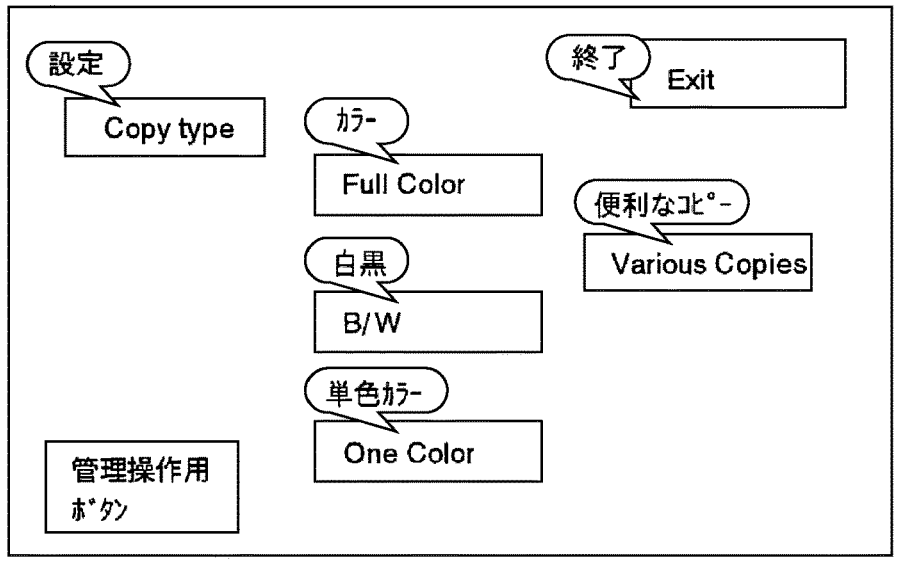
Figure 6C:
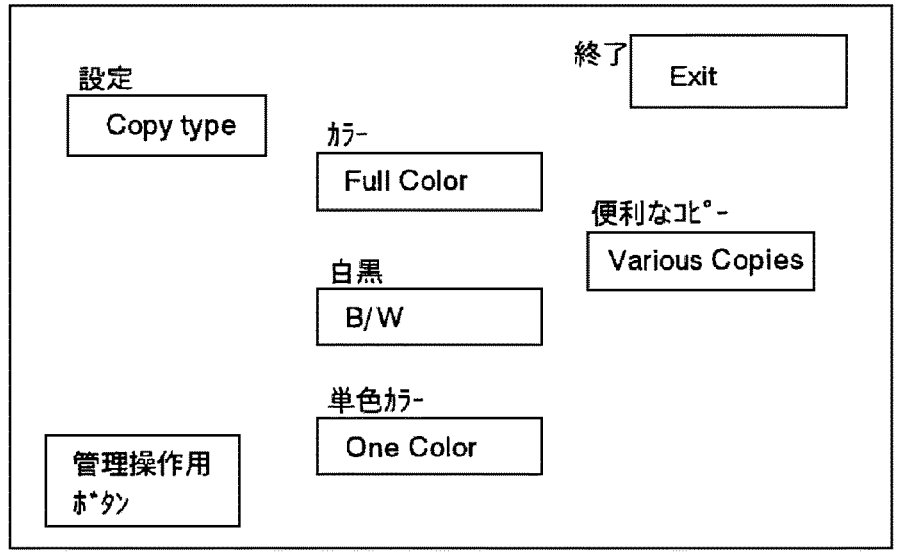

Further, the screen of the two-language simultaneous display is not limited to be displayed as in the display of FIG. 5C, and, for example, and a screen illustrated in each of FIGS. 6A to 6C may be displayed.

FIGS. 6A to 6C illustrate explanatory views of an example of the two-language simultaneous display in a screen displayed on the image forming apparatus 1 of the disclosure. FIGS. 6A to 6C all illustrate a display screen after the manager selects "Japanese" as the manager selection language 33 on the language selection screen of FIG. 5B. It is assumed that "English" is selected as the user selection language 32. Display content of each of the display items displayed on the display screen is the same as that of FIG. 5C.

FIG. 6A illustrates a case where each of the display items is displayed in two languages of "English" and "Japanese" together being divided into a left part and a right part.

By considering standing positions of the manager and the user from a viewpoint of visibility of the display items, it is desirable that the manager selection language 33 is displayed on a side closer to the standing position of the manager and the user selection language 32 is displayed on a side closer to the standing position of the user. For example, in a case of FIG. 6A, "Japanese" as the manager selection language 33 is displayed on the left side and "English" as the user selection language 32 is displayed on the right side, and thus it is desirable that the manager stands on the left side and the user stands on the right side.

Accordingly, though not illustrated, a display region that indicates replacement of display positions may be displayed so that the display positions of the user selection language 32 and the manager selection language 33 are able to be replaced in the left and right parts.

In FIG. 6B, each of the display items is displayed in such a manner that the notation in "English" as the user selection language 32 is displayed inside a frame of the display item and the notation in "Japanese" as the manager selection language 33 is displayed outside the frame by using a balloon. Though a position of the balloon is set on an upper left part outside the frame of the display item, the position is not limited thereto and may be any position of an upper right part outside the frame, a lower left part outside the frame, and a lower right part outside the frame.

Similarly to FIG. 6B, FIG. 6C illustrates a case where each of the display items is displayed in such a manner that the notation in "English" as the user selection language 32 is displayed inside a frame of the display item and the notation in "Japanese" as the manager selection language 33 is displayed outside the frame, but is displayed near an upper left part just above the frame of the display item here. The notation in "Japanese" as the manager selection language 33 may be displayed near the outside of the frame and the position thereof may be, other than the left part just above the frame of the display item, a left part just under the frame, a left part next to the frame, a right part next to the frame, or the like.

Example 4

Here, as a different example of the two-language simultaneous display illustrated in FIG. 5C, a case where a division display screen that is divided into a manager screen and a user screen is displayed will be described.

FIGS. 7A to 7D illustrate explanatory views of an example of a screen displayed on the image forming apparatus 1 of the disclosure. FIGS. 7A to 7D each illustrates a display screen after the user or the manager selects and inputs "Settei(Japanese)/Copy type" in the display state of FIG. 5C. A detailed setting item as a subordinate concept of "Settei/Copy type" is displayed with the two-language simultaneous notation. Additionally, it is assumed that "Japanese" is selected as the manager selection language 33 and "English" is selected as the user selection language 32.

Prior to explanation of the division display screen, first, FIG. 7A illustrates display in which each display item is displayed in languages of "English and "Japanese" together being divided into two of the upper part and the lower part, similarly to FIG. 5C.

Here, "Back" for returning to a previous screen, and "OK" and "Start" to be subjected to an input operation by the user are displayed in addition to five setting input items ("Full Color/B/W", "Paper/Two-Sided", "Enlarge/Reduce", "Density", and "Special"), "Exit", and "Manager operation button".

"OK" is display for expressing an intention of approving item content that is set before a copy function is executed and "START" is display for actually executing the copy function. The four of "Exit", "Back", "OK", and "Start" are decision input items to be mainly subjected an input operation by the user.

FIG. 7B illustrates a division display screen in which the display items illustrated in FIG. 7A are divided into a manager screen and a user screen. The display items using "Japanese" that is the manager selection language 33 are displayed on the manager screen 36 on a left side of FIG. 7B and the display items using "English" that is the user selection language 32 are displayed on the user screen 37 on a right side thereof.

On the manager screen 36 on the left side, only setting input items such as "Full Color/B/W" which may be subjected to an input operation by the manager are mainly displayed.

On the user screen 37 on the right side, the decision input items ("Back", "Exit", "OK", and "Start") to be input by the user are displayed in addition to the display items displaying the setting input items by using "English" as the user selection language 32.

As described above, only the setting input items which may be subjected to the input operation by the manager are displayed on the manager screen 36 by using the manager selection language 33 and the decision input items which may be subjected to the input operation by the user are displayed on the user screen 37 by using the user selection language 32, so that both the manager and the user are able to easily look at the display items to be subjected to the input operation and the manager is able to rapidly and appropriately give an explanation of an operation or carry out an operation aid with respect to the user.

In FIG. 7B, display using "Japanese" as the manager selection language 33 is performed on the manager screen 36 and display using "English" as the user selectin language 32 is performed on the user screen 37, and when a language different from the languages is selected as well, the two-division display may be similarly performed.

As another example of the two-division display screen, FIG. 7C illustrates a schematic view in which display using "Chinese" as the manager selection language 33 is performed on the manager screen 36 and display using "English" as the user selection language 32 is performed on the user screen 37.

Though the manager screen 36 is displayed on a left side of the display screen and the user screen 37 is displayed on a right side thereof in FIG. 7B, such two-division display is display that is desired in a case where an explanation of an operation or the like is given when the manager stands on the left side of the display screen and the user stands on the right side of the display screen.

On the other hand, in a case where an explanation of an operation or the like is given when the manager stands on the right side of the display screen and the user stands on the left side of the display screen, as illustrated in FIG. 7D, it is desirable that the manager screen 36 is displayed on the right side of the display screen and the user screen 37 is displayed on the left side thereof since the input operations of both the manager and the user are easy to be performed.

Accordingly, an item for switching and setting the two-division display between the display as in FIG. 7B and the display as in FIG. 7D may be displayed on the manager screen 36.

Example 5

In the aforementioned examples, a display screen in a case where the user using the image forming apparatus 1 asks the manager in the middle of an operation has been mainly described.

Here, a case where the user who is to use the image forming apparatus 1 asks the manager such as a person in charge of a store from the beginning will be described.

Figure 8A:
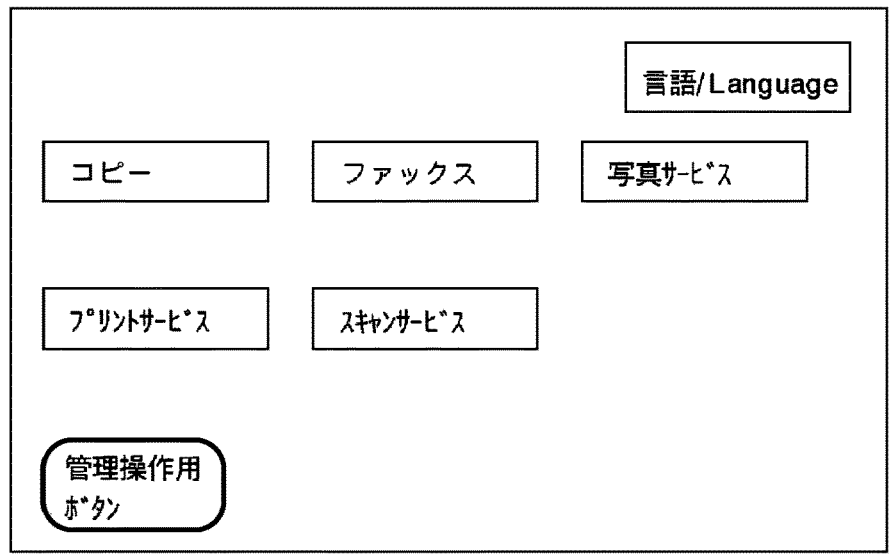
FIGS. 8A to 8C are explanatory views of an example of a screen displayed on the image forming apparatus of the disclosure.
Figure 8B:
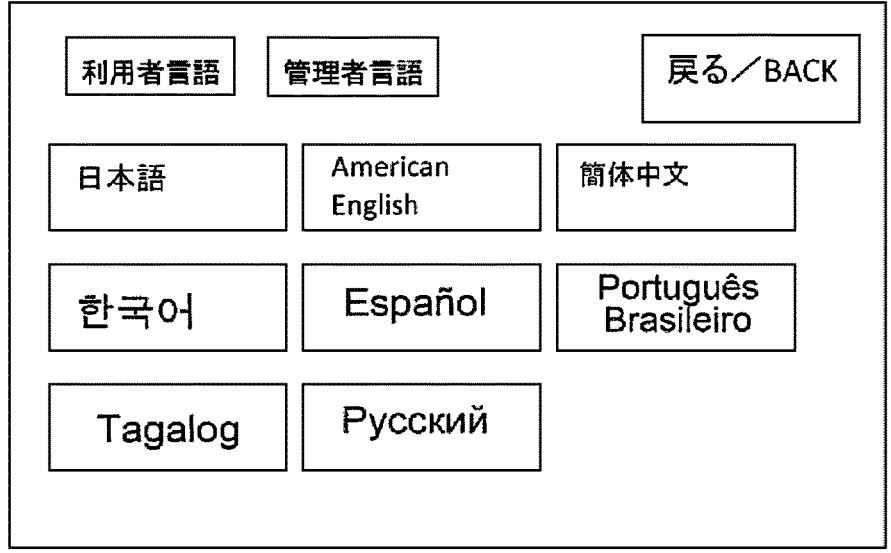
Figure 8C:
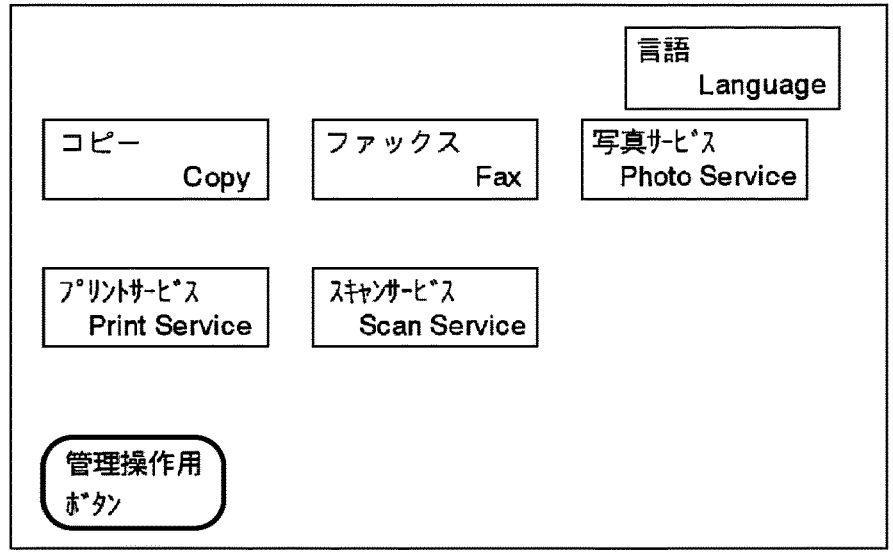

FIGS. 8A to 8C illustrate explanatory views of an example of a screen displayed on the image forming apparatus 1 of the disclosure.

FIG. 8A illustrates an initial screen with the Japanese notation that corresponds to the initial screen of the image forming apparatus 1 illustrated in FIG. 3A.

Differently from FIG. 3A, FIG. 8A illustrates the screen in which "Manager operation button" as illustrated in FIG. 4B or the like is displayed on a lower left part of the initial screen.

In a case where the user who is to use the image forming apparatus 1 asks the manager before performing an operation, when the initial screen as in FIG. 8A is displayed, the manager who comes to the image forming apparatus 1 performs an input operation of "Manager operation button" in order to give an explanation of an operation or the like.

When the input operation of "Manager operation button" is performed, a language selection screen for selecting a manager language and a user language is displayed as in FIG. 8B.

The language selection screen of FIG. 8B is similar to the language selection screen of FIG. 3B or FIG. 5B, but provides display on an upper left part of the screen so as to allow inputting which language of "User language" and "Manager language" is to be selected.

For example, when the manager selects a display region of "User language" and then the user selects and inputs a region where a desired language of the user is displayed, the user selection language 32 is set to the desired language.

When the manager selects a display region of "Manager language" and then selects and inputs a region where a desired language of the manager is displayed, the manager selection language 33 is set to the desired language.

As described above, the user selection language 32 and the manager selection language 33 are selected and then the initial screen of FIG. 8A is switched to a screen that is displayed in two languages as illustrated in FIG. 8C.

FIG. 8C illustrates an initial screen after "English" is selected as the user selection language 32 and "Japanese" is selected as the manager selection language 33. FIG. 8C illustrates a case where each of the display items is displayed being divided into two of an upper part using a notation in the manager selection language 33 and a lower part using a notation in the user selection language 32.

Thereby, the display items that are displayed in languages understandable to both the user and the manager are displayed in a state where the initial screen is displayed, so that it is possible to easily progress an explanation of an operation or an operation aid while the user and the manager look at the same two-language simultaneous display screen from a time when the user starts to use the image forming apparatus 1.

Example 6

In the aforementioned examples, processing for carrying out an operation aid regarding a language by a staff of a store has been described. However, processing for switching a display language may be applied not only to the aforementioned image forming apparatus 1 installed in the store, but to an image forming apparatus installed in an office, for example. This makes it possible to install the image forming apparatus 1 in a wide range.

Example 7

In the aforementioned examples, for example, processing for switching display when the user and the manager perform input operations in the image forming apparatus has been described. However, there is also a case where two users whose native languages are different perform input operations, and also when one of the users teaches an operation method to the other user, the two-language simultaneous display or the display switching as described above is able to be used. For example, when one of the users is a Japanese and the other user is a foreigner and the user who is the Japanese teaches the operation method to the user who is the foreigner, the display unit may be divided into a left section and a right section, and a manager screen with the Japanese notation may be displayed on a side closer to a position where the user who is the Japanese stands and a user screen with a notation of the native language of the foreigner may be displayed on a side closer to a position where the user who is the foreigner stands.

<Explanation of Processing for Switching Display Language in Image Forming Apparatus>

Figure 9:
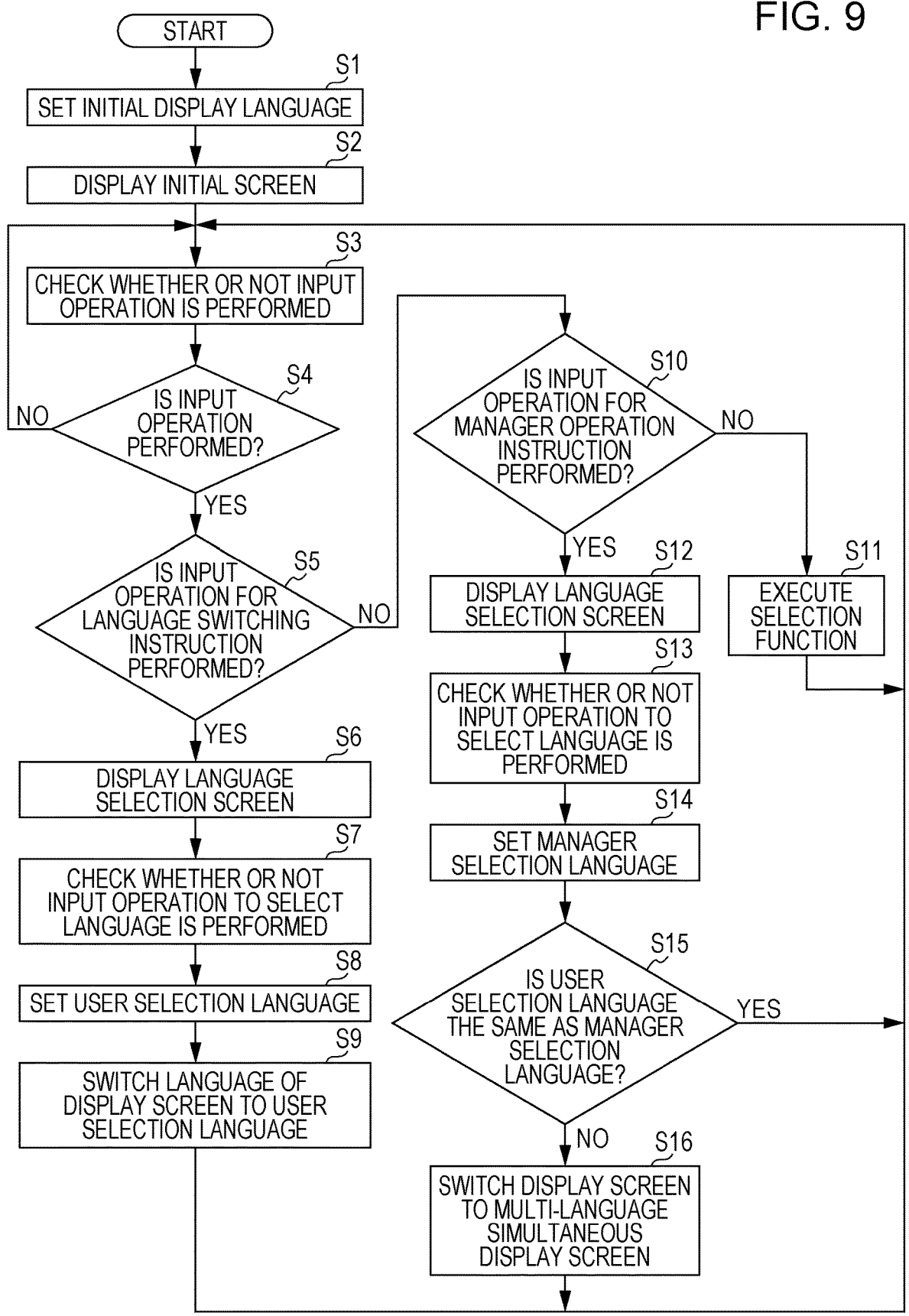
FIG. 9 is a flowchart of an example of processing for switching a display language in the image forming apparatus of the disclosure.

FIG. 9 is a flowchart of an example of processing for switching a display language in the image forming apparatus of the disclosure.

Here, description will be given for processing in which an initial display language of an initial screen that is displayed on the display unit 12 of the image forming apparatus 1 is set, and then, when a user selects and inputs a user selection language, a language of display items that are displayed on a display screen is switched to the user selection language, and when a manager selects and inputs a manager selection language, each of the display items is displayed in two languages of the user selection language and the manager selection language simultaneously. When the image forming apparatus 1 is activated, it is set that the initial screen as illustrated in FIG. 3A is displayed. In addition, it is set that both a user language and a manager language on the initial screen are initially set to Japanese.

At step S1 of FIG. 9, a display language used for the initial screen is set. For example, a person in charge of a store performs an input operation to set an initial display language by using the input unit 13 and thereby selects the display language. Since "Japanese" is set as initial setting, step S1 may be omitted when Japanese is used as the display language. When the image forming apparatus 1 is installed in a foreign country other than Japan, when most users are not Japanese but foreigners from certain countries, or when the person in charge of the store is not a Japanese, for example, the initial display language may be set.

At step S2, the initial screen is displayed by using the initial display language that is set.

At step S3, whether or not an input operation is performed is checked by using the input unit 13.

At step S4, when some input operation is performed, the procedure proceeds to step S5, and when no input operation is performed, the procedure returns to step S3.

At step S5, whether or not an input operation for a language switching instruction is performed is checked. When the input operation for the language switching instruction is performed, the procedure proceeds to step S6, or otherwise the procedure proceeds to step S10. Here, for example, whether or not the display region of "Gengo/Language" illustrated in FIG. 3A is selected and input is checked.

At step S6, a language selection screen for a user is displayed. For example, the language selection screen illustrated in FIG. 3B is displayed. The user selects and inputs a region where a desired language is displayed while looking at the language selection screen in order to switch the display items to be displayed in the desired language.

At step S7, whether or not an input operation to select a language is performed is checked. When the input operation to select a language is performed, the procedure proceeds to step S8, or otherwise the check at step S7 is repeated, or when there is no input operation for a fixed time or more, caution is displayed to notify the user that selection input is to be performed. At step S8, the selected language is set and stored as the user selection language 32. At step S9, the display screen is displayed by switching the language of the display screen to the user selection language 32. For example, when "English" is set as the user selection language 32, the initial screen of FIG. 3A is switched to the initial screen with the English notation in FIG. 3C. Then, the procedure returns to step S3.

At step S10, whether or not an input operation for a manager operation instruction is performed is checked. When the input operation for the manager operation instruction is performed, the procedure proceeds to step S12, or otherwise the procedure proceeds to step S11. The input operation for the manager operation instruction corresponds to selecting and inputting the display region of "Manager operation button" illustrated in FIG. 4B, for example. Accordingly, the input operation is performed by the manager.

When an input operation is performed other than those for the language switching instruction and the manager operation instruction, the procedure proceeds to step S11, and at step S11, a selection function corresponding to the input operation is executed and the procedure returns to step S3.

At step S12, a language selection screen for a manager is displayed. For example, the language selection screen as illustrated in FIG. 5B is displayed. At step S13, whether or not an input operation to select a language is performed is checked. When the input operation to select a language is performed, the procedure proceeds to step S14, or otherwise the check at step S13 is repeated, or when there is no input operation for a fixed time or more, caution is displayed in order to notify the manager and the user that selection input is to be performed. At step S14, the selected language is set and stored as the manager selection language 33.

At step S15, the user selection language 32 and the manager selection language 33 that are set are compared with each other, and when the user selection language 32 is the same as the manager selection language 33, the procedure returns to the step S3, or otherwise the procedure proceeds to step S16.

At step S16, since the user selection language 32 and the manager selection language 33 are different, the display screen is switched to a multi-language simultaneous display screen (two-language simultaneous display screen) in which languages of the display screen are constituted by the user selection language 32 and the manager selection language 33. For example, the display screen is switched to the two-language simultaneous display screen as illustrated in FIG. 5C or each of FIGS. 6A to 6C. Alternatively, as illustrated in FIG. 7B or FIG. 7D, the display screen may be switched to a division display screen that is composed of a manager screen and a user screen. Thereafter, the procedure returns to step S3.

When the user selection language 32 is the same as the manager selection language 33, instead of merely returning to step S3 without switching the screen, the procedure may return to step S3 after the display screen is switched to the division display screen that is composed of the manager screen and the user screen, even when the user selection language 32 is the same as the manager selection language 33. The flowchart of an example of processing for switching a display language is described above.

In the aforementioned examples, the processing for switching a display language of display items displayed on the display unit in the image forming apparatus has been described, but an apparatus to which the processing for switching a display language is applicable is not limited to the image forming apparatus. The processing for switching a display language according to the disclosure is applicable also to an information processing apparatus which is assumed to be used in a situation where a manager of the apparatus and a user using the apparatus are persons whose native languages are different and the user and the manager use the apparatus together. For example, in an apparatus such as a POS register, a personal computer, a tablet, a mobile terminal of a smartphone, the processing for switching a display language according to the disclosure is applicable.

The present disclosure contains subject matter related to that disclosed in Japanese Priority Patent Application JP 2017-122224 filed in the Japan Patent Office on Jun. 22, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus comprising:
an input to which a given function selection is provided;
a display that displays a plurality of display keys each including a function selection key;
a language selection processor that selects a plurality of languages; and
a display switching processor that switches a language of the display keys displayed on the display through selection provided to the input, wherein
when the display operates in a multi-language simultaneous display, each of the display keys displayed on the display is simultaneously displayed in at least both of a first language and a second language,
when the display operates in a single-language display, each of the display keys is displayed in only the first language, and
the mufti-language simultaneous display and the single-language display are switchable.

2. The image forming apparatus according to claim 1, wherein
the display displays a first language selection screen for selecting the first language and a second language selection screen for selecting the second language, the first language is selected through an operation input to the input to select a desired language from among a plurality of languages displayed on the first language selection screen, and the second language is selected through an operation input to the input to select a desired language from among a plurality of languages displayed on the second language selection screen, and
when the first language and the second language are different, the multi-language simultaneous display is performed.

3. The image forming apparatus according to claim 1, wherein
the multi-language simultaneous display includes at least display in which the display key is displayed on one given operation key receiving input by using the first language and the second language, the display key being displayed with two language notations divided into a left part and a right part in the display frame or displayed with two language notations divided into an upper part and a lower part in the display frame.

4. The image forming apparatus according to claim 1, wherein
in the multi-language simultaneous display, the display key is displayed on one given operation key receiving input by using the first language and displayed around an outside of the display frame by using the second language.

5. The image forming apparatus according to claim 1, wherein
the multi-language simultaneous display is constituted by two-division display screens that are obtained by dividing a display screen of the display into a first screen and a second screen, and
the display key is displayed on the first screen by using the first language and the display key is displayed on the second screen by using the second language.

6. The image forming apparatus according to claim 5, wherein
the display keys displayed on the display include a setting input key that is set for each of execution functions and a decision input key for deciding content of the setting input key and start of executing a function of the setting input key, and the setting input key is displayed on the second screen and the decision input key is displayed on the first screen.

7. The image forming apparatus according to claim 1, wherein
the input is a touch panel, and
the touch panel and the display are overlapped with each other.

8. The image forming apparatus according to claim 5, further comprising a display position setting processor that sets display positions of the first screen and the second screen on the display.

* * * * *